United States Patent [19]
Kouloheris et al.

[11] 3,806,046
[45] Apr. 23, 1974

[54] DRY EXTRACTION AND PURIFICATION OF PHOSPHATE PEBBLES FROM RUN-OF-MINE ROCK

[75] Inventors: Anastasios P. Kouloheris, Brandon; Min Sheng Huang, Jacksonville, both of Fla.; Charles C. Fite, Hightstown, N.J.

[73] Assignee: Cities Service Company, New York, N.Y.

[22] Filed: Aug. 18, 1972

[21] Appl. No.: 281,693

[52] U.S. Cl. .................................. 241/24, 241/29
[51] Int. Cl. ............................................. B02c 19/12
[58] Field of Search .......................... 241/24, 25, 29

[56] References Cited
UNITED STATES PATENTS 3,037,624   6/1962   Jackson et al. ................. 241/24 X
2,877,954   3/1959   Myers ............................. 241/29 X

*Primary Examiner*—Granville Y. Custer, Jr.
*Attorney, Agent, or Firm*—Joshua J. Ward

[57] ABSTRACT

This invention is an improved process for manufacturing pure phosphate pebbles from run-of-mine phosphate rock through a process of crushing, drying, disintegrating, separating and purifying. A secondary purification step comprising controlled disintegration, air classification and electrostatic separation is desirable in those cases where the run-of-mine rock used contains higher than the usual amount of iron and aluminum.

11 Claims, 3 Drawing Figures

3,806,046

DRY EXTRACTION AND PURIFICATION OF PHOSPHATE PEBBLES FROM RUN-OF-MINE ROCK

BACKGROUND OF THE INVENTION

This invention relates to the dry extraction and purification of phosphate pebbles from run-of-mine phosphate rock. More particularly, this invention claims an improved process for manufacturing phosphate pebbles from run-of-mine phosphate rock through processes involving crushing, drying, disintegrating, separating and purifying to produce a product with an iron and aluminum content lower than the present level of 2.5 wt. % obtained with a conventional system.

In a conventional system of wet beneficiation of phosphate rock, a phosphate product commonly known as phosphate pebbles is effectively extracted from adhered clay only after intensive wet attritioning, screening and scrubbing with log washers at the plant. This product amounts to about 15 wt. % of the mined matrix and contains about 30 wt. % $P_2O_5$, and 2.5 wt. % iron and aluminum impurities. However, due to the intensive wet treatment and the fragility of the phosphate particles, a large amount of phosphates is normally lost through the formation of slimes which are −150 mesh particles. These losses represent about 25 to about 30 wt. % of the $P_2O_5$ in the mined matrix. Also, due to the limited effectiveness of mechanical scrubbing, further purification of the phosphate pebbles (i.e., below 2.5 wt. % iron and aluminum) is not possible.

Numerous attempts have been made in the past to develop methods of treating the slimes as they are formed. In all cases, the cost of the treatment made it uneconomical. A number of patents have also been issued on the treatment of dry phosphate rock to reduce or prevent the formation of slimes. However, in such processes, no further purification of the pebbles has been investigated. As a result of this, the phosphate pebbles produced have included iron and aluminum at prohibitive levels and selective mining had to be employed to limit the iron and aluminum content to an acceptable limit (i.e., 2.5 wt. % iron and aluminum). In this regard, it should be noted that in a conventional system of wet beneficiation as practiced today, the elimination of iron and aluminum impurities from the phosphate concentrate is very limited. This is due to the fact that this elimination is solely based on a successive number of inefficient mechanical wet scrubbing steps (such as log washers and screens) to remove the adhered clay. Therefore, to secure the final phosphate pebble concentrate that would have an acceptable iron and aluminum content, selective mining of phosphate raw material is employed as the primary control of the final impurity content.

SUMMARY OF THE INVENTION

It is therefore an object of this invention to produce an improved process in the manufacture of phosphate pebbles whereby selective mining of phosphate raw material for primary control of iron and aluminum content is not needed.

It is still another object of this invention to produce an improved process wherein run-of-mine phosphate rock is treated when dried to produce clean phosphate pebbles without the formation of undesirable slimes and the association $P_2O_5$ losses that are concomitant with the undesirable slimes.

It is yet another object of this invention to provide a solution to the problem of further purification of phosphate pebbles by a combination of controlled disintegration, air classification and electrostatic separation, this combination being capable of producing a product with an iron and aluminum content lower than the present level of 2.5 wt. % obtained with a conventional system.

Still other objects will be apparent to those skilled in the art from the following description of this invention.

The foregoing objects are achieved according to the practice of this invention. Broadly, this invention comprises an improved process for manufacturing phosphate pebbles from run-of-mine phosphate rock comprising crushing run-of-mine phosphate rock; drying the crushed run-of-mine phosphate rock; disintegrating the dried, crushed run-of-mine phosphate rock; separating impure phosphate rock from the disintegrated, dried, crushed run-of-mine phosphate rock; and purifying the impure phosphate rock.

Thus, by the practice of this invention there is provided an economical process for manufacturing phosphate pebbles without the formation of undesirable slimes and the associated $P_2O_5$ losses that accompany the undesirable slimes; and without the present level of 2.5 wt. % iron and aluminum impurities that are associated with a conventional system.

DETAILED DESCRIPTION OF THE INVENTION

Figure 1:
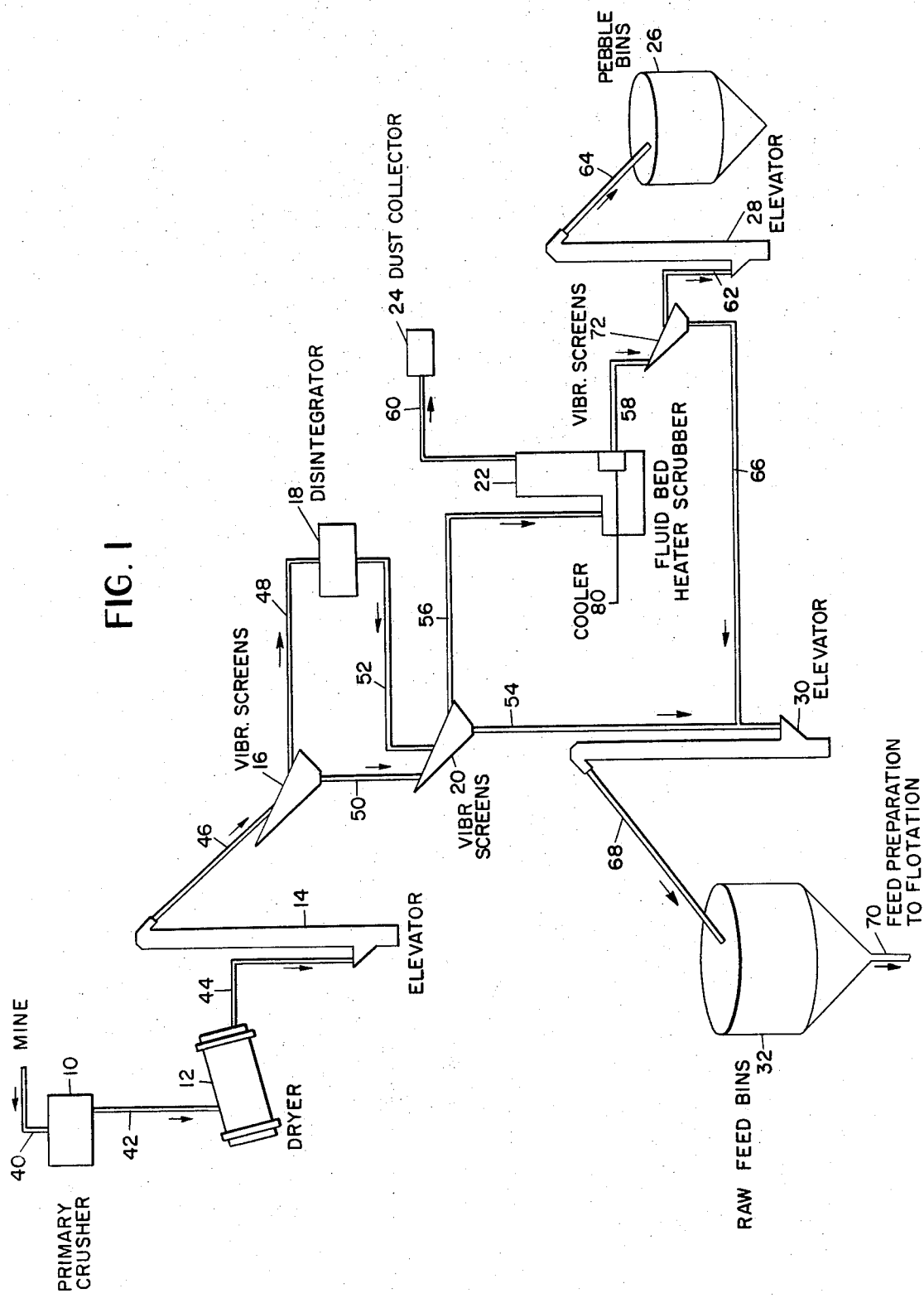
FIG. 1 is a flow diagram for the preferred embodiments of the invention.

In the production of pure phosphate pebbles, run-of-mine rock having at least about 3 wt. % iron and aluminum impurities is initially crushed below about 1 inch in size. The crushed rock is subsequently dried. The drying of the run-of-mine rock can be achieved by use of a rotary, conveyor or tunnel type of a kiln, provided that either the operating conditions are kept such that balling is avoided, or that an intermediate crushing of the balled material (i.e., clay) is utilized. After thorough drying, the dried matrix is further disintegrated under controlled conditions so that the final product is less than about ½ inch in size. This may be done through the use of an impact type disintegrator in a closed circuit with a ½ inch aperture vibrating screen.

Disintegration is to be followed by the separation of the impure phosphate pebbles by screening at 20 mesh. The −20 mesh screened material may subsequently be directed to a conventional wet beneficiation process. The impure phosphate pebbles are contained within the +20 mesh screened material which is directed to further purification by disengaging the adhered surface clay through the application of an autogenous attrition. This is carried out in a fluidbed scrubber at approximately 400°C. for about two hours retention time at an air velocity at approximately 30 to 40 feet per minute. The fluid-bed unit is of a design and configuration similar to that of a conventional fluid-bed dryer. The bed overflow from this scrubber should be further screened in another 20 mesh screen. The −20 mesh screened product should be treated by conventional wet beneficiation methods. The +20 mesh fraction from this second screening contains the final purified phosphate pebble product. Further purification of this pebble product, if so desired, can be achieved by the application of an electrostatic separator. This secondary purification step is recommended in those cases where the run-of-mine rock used contains higher than the usual amount of iron and aluminum content; and therefore results in a phosphate pebble product analyzed with more than 2.5 wt. % iron and aluminum. This is usually the case where the major proportion of iron and aluminum is interlocked within the phosphate pebble itself rather than being in the form of a surface coating. Therefore, to achieve further purification, the pebble should subsequently be submitted to a secondary stage of controlled disintegration followed by an air separation. This stage is a preparation step for the electrostatic separation process.

Controlled disintegration is accomplished by selectively crushing the above-mentioned final purified phosphate pebble product to the −20 +200 mesh size with preferably only a small quantity (below about 10 wt. %) of −200 mesh fines being produced. Selective crushing is accomplished through the use of an impact-type mill. The crushed material may subsequently be submitted to air separation for the removal of −200 mesh fines. Air separation may be performed by the use of a conventional centrifugal air separator where utilization of both centrifugal force and the air drag force yields a product containing about 1 to about 2 wt. % fines only.

The coarse product from the air separator is then fed to a discharge electrostatic separator to recover phosphate pebbles containing less than 2.5 wt. % iron and aluminum impurities.

While the foregoing discussion has been a detailed description of the invention, the preferred embodiment of the invention is best shown by reference to FIG. 1 which is a flowsheet for operation of our invention.

According to this embodiment, phosphate rock raw material is mined as usual through the use of a drag line. However, the discharge from the drag line is not submitted to the conventional hydraulic plunging and conveying. Instead, it is conveyed, as recovered, by a belt of screw conveyor, or by trucks, to the beneficiation plant. At the plant, the material is first submitted through conduit 40 into primary crusher 10, which through the use of a jaw crusher and grizzley produces a crushed product of about 1 inch in maximum size. This crushing produces a size reduction of the clay balls and other agglomerated material. The crushed product is then conveyed through conduit 42 to a conveyor or tunnel-type dryer 12, well known to those skilled in the art, where it is dried to a maximum of approximately 5 wt. % moisture. The selection of this type of dryer is preferred to avoid possible balling of the material during drying. The dried material exits through conduit 44 into an elevator 14 where it is discharged through conduit 46 onto vibrating screens 16. These vibrating screens screen the dried material through ½ inch apertures.

The oversize from this screen is fed through a conduit 48 into preferably an impact type disintegrator 18 (also known as an impact-type mill). This step of the process comprises a controlled disintegration in that the material is ground to a product that has the following screen analysis:

| Size | Wt. % Passing |
|---|---|
| ½ inch | 100 |
| 8 mesh | 90 |
| 10 mesh | 85 |
| 20 mesh | 65 |
| 100 mesh | 10 |
| 200 mesh | 5 |

In this impact milling, the shattering powers are in direct proportion to the particle size. Thus, a maximum crushing power is applied to the reduction of large fragments while an absolute minimum is wasted to the production of fines fragments. This is quantitatively shown wherein the product contains 35 % in the −½ inch +20 mesh fractions, 55% in the −20 +100 mesh fractions and only 10% in a −100 mesh size. The principle of this type of crushing is based on the fact that the impact energy varies directly with the particle mass and the square of the beater (rotor) speed.

Thus, the larger the fragments surviving the first impact, the harder they are hit again against the grinding surface. We have found that an optimum and preferred impact speed is that corresponding to a peripheral velocity of 4000–6000 fpm, preferably 5000 fpm. Under these conditions, small finished particles are easily swept away and only the hard and larger fragments are reduced in size. Impact milling such as described above can be employed with such commercial impact units as the Impact Crusher manufactured by Pennsylvania Crushing Company, or the Cage-Pactor manufactured by Gundlach Cage-Pactor, provided that a peripheral speed of 4000 to 6000 fpm is employed and the material feed is not more than 1 inch in size. These commercial units are well known to those skilled in the art.

The impact mill discharge exits through conduit 52 and is fed simultaneously with the screen undersize particles from the vibrating screen 16 (that exit through conduit 50) to a 20 mesh vibrating screen 20 to separate the primary phosphate pebble product (−½ inch +20 mesh) from the −20 mesh fraction. The latter fraction is conveyed through conduit 54 into elevator 30 where it exits through conduit 68 into raw feed bins 32, thereafter the feed can be further treated, after passing through conduit 70, by conventional wet beneficiation methods (such as flotation). The −½ inch +20 mesh primary pebble fraction leaves vibrating screen 20 through conduit 56 into a fluid bed heater-scrubber 22 for attrition. This scrubber structurally comprises a standard fluid-bed dryer well known to those skilled in the art. However, the preferred conditions of operation to achieve removal of the adhered surface-clay through scrubbing are as follows:

FLUID-BED SCRUBBING CONDITIONS

| | |
|---|---|
| Air Velocity: | 30–40 ft/min., preferably 35 ft/min. |
| Bed Temperature: | 300–500°C., preferably 400°C. |
| Retention Time: | 1–3 hours, preferably 2 hours |
| Bed Expansion: | 40–60%, preferably 50%, i.e., bed expansion under dense phase conditions for more efficient particle to particle collision and therefore more effective scrubbing |

The bed overflow, together with the unit's cyclone underflow comprising the scrubbed pebble product, are both directed to an adiabatic, counter-current air cooler (rotary type) 80, well known to those skilled in the art, wherein the material is cooled down to about 50°C. Since the air utilized for cooling will carry with it substantial heat values, it is further used as the fluidization air in the fluid bed; thus realizing significant savings in the fuel economy.

The cooled pebble product is then fed to a 20 mesh vibrating screen 72 through conduit 58 to screen out the portion of the pebbles that was attrited during scrubbing. This −20 mesh fraction, comprising about 4% of the phosphate pebbles fed, is directed through conduit 66 into conduit 54 for conventional wet beneficiation (such as flotation). The +20 mesh fraction exits vibrating screen 72 through conduit 62 into elevator 28 for exiting through conduit 64 into pebble bins 26.

As mentioned earlier, another feature incorporated into this invention is the dry purification of pebbles through the electrostatic removal of iron and aluminum impurities. An embodiment of this part of the invention is represented in FIGS. 2 and 3.

Figure 2:
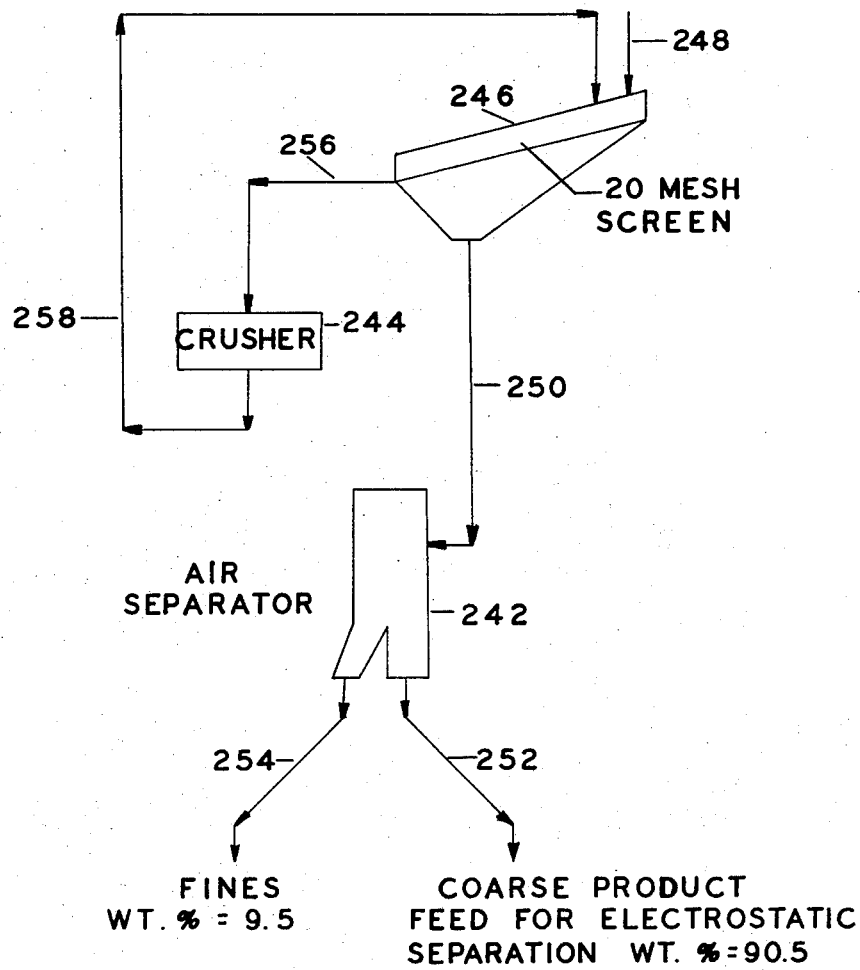
FIG. 2 is a diagram of the pre-processing steps for electrostatic separation.
Figure 3:
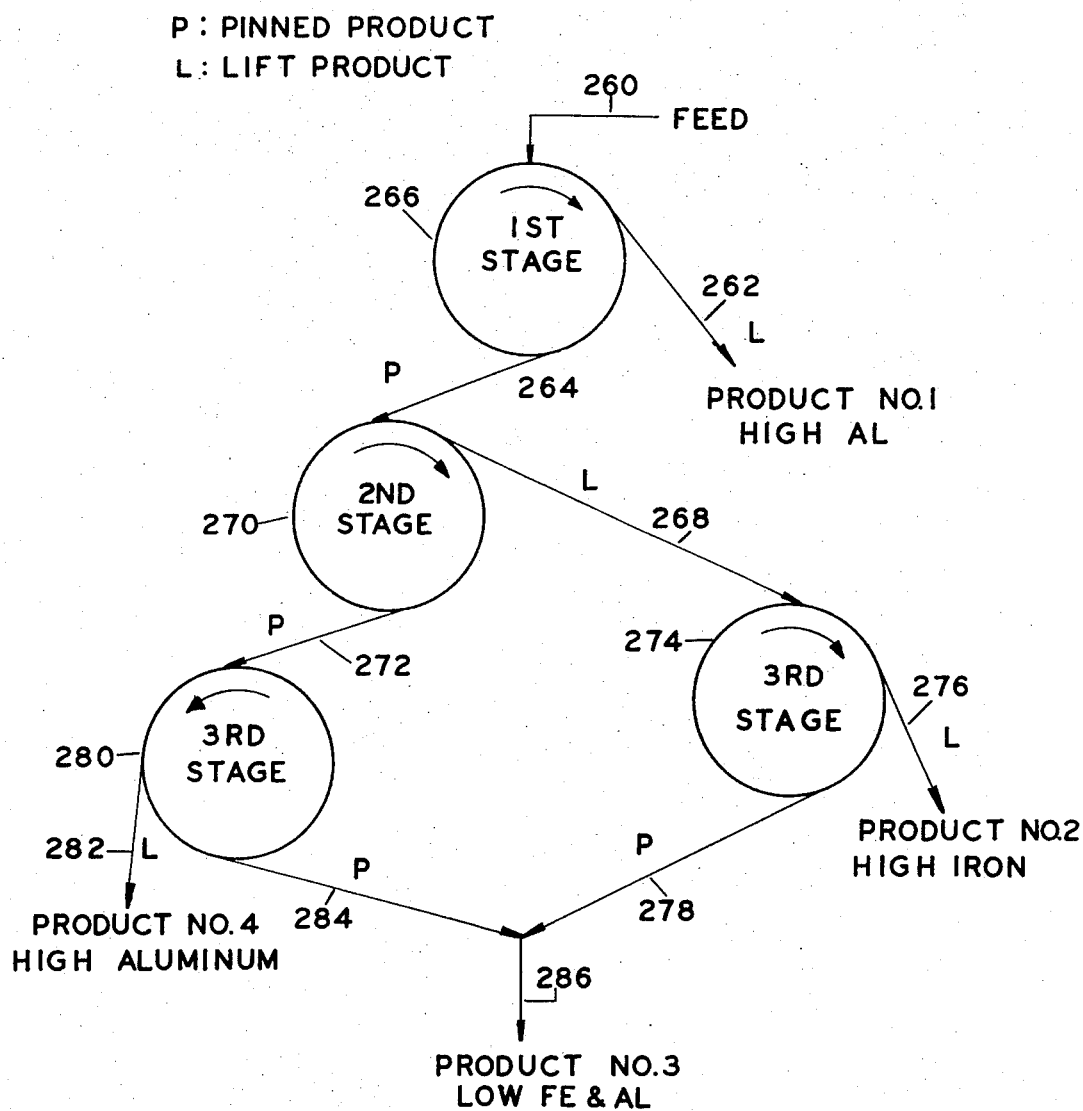
FIG. 3 is a diagram of a 3-stage electrostatic separation process.

According to this embodiment, impure phosphate pebbles are first submitted to a pre-processing step as shown in FIG. 2. The purpose of this step is to prepare the feed for the electrostatic separator by properly liberating and disengaging the iron and aluminum impurities from the phosphate particles. An important factor of the pre-processing is to achieve the iron and aluminum liberation within a particle range of −20 +200 mesh in order to be effectively amenable to electrostatic separation.

The impure phosphate pebble is first screened from conduit 248 through a 20 mesh vibrating screen 246. The oversize fraction from this screen exits through conduit 256 into an impact type mill crusher 244 such as the ones described previously. The peripheral speed of the mill coupled with the feed rate are regulated so that the crushed product contains not more than 10% −200 mesh fines. The crushed product exits crusher 244 through conduit 258 for recycling onto screen 246. The undersize fraction of the screen exits through conduit 250 to a mechanical, whizzer-type, air separator 242 where the fines from the coarse products are separated. The fines exit through conduit 254 and the coarse products exit through conduit 252.

The laboratory conditions for the air separator that were found to be most effective in the removal of −200 mesh fines were as follows:

| | |
|---|---|
| Whizzer diameter: | 7 inches |
| Number of whizzers: | 2 |
| Number of blades/whizzer: | 12 in upper whizzer and 24 in lower |
| Rotational speed: | 3600 rpm |
| Peripheral speed: | 6580 fpm |
| Feed rate: | 380 lbs/hr |

FIG. 2 also shows the overall material balance including chemical analyses. It is seen that 90.5 wt. % of the material fed to the air separator was received as coarse product (−20 +200 mesh) analyzing 30.08 wt. % $P_2O_5$ and 2.46 wt. % iron and aluminum. This product is then fed to the electrostatic separator for the iron and aluminum removal.

After the foregoing pre-processing steps, the product is subsequently fed to an electrostatic separator for further removal of iron and aluminum impurities. A 3-stage electrostatic separation as shown in FIG. 3 is preferred. The feed to the separator should first be heated to approximately 65°C. and then fed into the unit's feed hopper which is electrically heated to maintain the temperature of the material to within ±5°C. The feed leaves the feed hopper and enters through conduit 260 into first stage 266 where the iron and aluminum impurities are initially electrostatically "lifted" while the phosphate components are "pinned". The lift product and the pinned product are designated in FIG. 3 by L and P, respectively, for all stages of separation.

After electrostatic separation in first stage 266, product No. 1, which contains a high proportion of aluminum, exits through conduit 262 while the pinned product exits through conduit 264 and enters the second stage 270 for further electrostatic separation. The electrostatic separation takes place and lift products exit through conduit 268 into the third stage separator 274 and the pinned products exit through conduit 272 into a third stage separator 280. The third stage electrostatic separator 274 further separates the above lift products from various other impurities that are pinned. These lift products exit conduit 276 as product No. 2 and are high in iron. The pinned impurities exit the above third stage separator through conduit 278. The third stage separator 280 for pinned products of the second stage separates these products into more lift products which exit through conduit 282, as product No. 4, high in aluminum and more pinned products that exit through conduit 284. The composite of the products from conduit 278 and conduit 284 is product No. 3, low in iron and aluminum.

The preferred model for electrostatic separation is the Corona discharge electrostatic separator or the Carpco high-tension separator. The preferred electrostatic conditions of separation are as follows:

| | |
|---|---|
| D. C. voltage: | 30–34 KV |
| Polarity: | Positive |
| Rotor speed range: | 35–220 RPM |
| Type of electrodes: | Combination of beam electrode and static rotating electrode |
| Feed rate: | 20–50 lbs/hr/inch of rotor length |
| No. of separation stages: | 3-stage |
| Operating temperature: | 60–70° C. |

TABLE I

| | 1 | | | 2 Fines: 9.44 | | 3 Coarse: 90.56 | |
|---|---|---|---|---|---|---|---|
| | Analyses | Dist. | | Analyses | Dist. | Analyses | Dist. |
| | % | % | % | % | % | | % |
| $P_2O_5$ | 30.10 | 100 | 30.26 | 9.50 | 30.08 | | 90.50 |
| Insol | 8.65 | 100 | 6.10 | 6.71 | 8.91 | | 93.29 |
| CaO | 45.85 | 100 | 46.84 | 9.64 | 45.75 | | 90.36 |
| MgO | 0.308 | 100 | 0.627 | 19.16 | 0.275 | | 80.84 |
| $Al_2O_3$ | 0.688 | 100 | 1.308 | 17.88 | 0.624 | | 82.12 |
| $Fe_2O_3$ | 1.804 | 100 | 1.466 | 7.59 | 1.842 | | 92.14 |
| Fe & Al | 2.492 | 100 | 2.754 | 10.43 | 2.466 | | 89.57 |

Table I illustrates the overall initial chemical distribution of a typical phosphate material before the final step of electrostatic separation. Column 1 of Table I illustrates the overall initial chemical analysis and distribution of the phosphate material before controlled disintegration in FIG. 2; column 3 shows the percent coarse material as 90.56 leaving separator 242 via conduit 252 in FIG. 2 after controlled disintegration of the coarse material as well as the chemical analysis and percent distribution of each component. Finally, column 2 of Table I shows the percent fines as 9.44 leaving separator 242 via conduit 254 in FIG. 2 after controlled disintegration of the fine material as well as the chemical analysis and percent distribution of each component.

TABLE II

| | Low Fe & Al: 77.74 | | High Al: 5.95 | | High Fe: 6.87 | |
|---|---|---|---|---|---|---|
| | Analysis % | Dist. % | Analyses % | Dist. % | Analyses % | Dist. % |
| $P_2O_5$ | 30.58 | 78.97 | 23.90 | 4.72 | 29.88 | 6.81 |
| Insol | 8.61 | 77.34 | 13.39 | 9.24 | 8.42 | 6.71 |
| CaO | 45.52 | 77.16 | 42.24 | 6.13 | 47.15 | 7.07 |
| $Al_2O_3$ | 0.583 | 65.99 | 1.178 | 10.17 | 0.598 | 5.96 |
| $Fe_2O_3$ | 1.340 | 57.76 | 1.735 | 5.71 | 7.603 | 28.94 |
| Fe & Al | 1.923 | 60.04 | 2.913 | 6.94 | 8.201 | 22.59 |

Table II shows the final results after electrostatic separation. It can be seen that by employing the controlled disintegration of a feed pebble containing approximately 2.49 percent iron and aluminum, a low iron and aluminum product with only 1.9 wt. % iron and aluminum is produced in material representing about 77 wt. % of the feed. This is illustrated in column 1 of Table II which also shows the chemical analysis and percent distribution of the low iron and aluminum product. Column 2 and column 3 of Table II show the high aluminum and high iron products of the electrostatic separation, respectively. Column 2 illustrates product No. 4 in FIG. 3 which leaves via conduit 282. Column 3 shows a product No. 2 which is high in iron leaving the third stage of FIG. 3 via conduit 276.

Thus, with the electrostatic purification process of this invention, a pure phosphate pebble concentrate can be easily produced. The two other products of this electrostatic separation, namely the high iron and aluminum and air separator fines, can both be utilized in the wet acid manufacture for those applications where the iron and aluminum content is not critical; for example, in the manufacture of triple superphosphate.

Besides this, another major advantage of this invention is that with the dry extraction method, a pebble concentrate can be produced representing 44.5 wt. % or more of the matrix weight and containing 75.5 wt. % of the original $P_2O_5$ in the matrix. In comparison, present wet beneficiation recovers only 15 wt. % of the matrix as phosphate pebbles containing only 32.8 wt. % of the original $P_2O_5$ in the matrix.

While the overall principles of this invention, as described in the foregoing, constitute the basic element of this process, mechanical variations and modifications can be used to achieve the same results. Some of these modifications or variations are as follows:

a. Primary, controlled disintegration of the dry material can be extended to a size smaller than ½ inch provided that the amount of −100 mesh material produced does not exceed 10 wt. % of the feed.

b. Primary and secondary screening of the pebbles is not limited to the 20 mesh separation indicated by this invention. Depending on the degree of liberation and mineral type of the pebbles, separation can be employed upwards to 10–14 mesh or downwards to 25–30 mesh.

c. Electrostatic purification of pebbles is carried out in a 3-stage scheme in this invention. However, depending on the degree of interlocking of iron and aluminum in the pebble, two stages or even one stage may suffice. In cases where this interlocking is more severe, an intermediate selective grinding between the first and second stages, or between the second and third stages of the electrostatic separation may be effected. With this modification, additional liberation of the iron and aluminum components can be achieved so that the subsequent stages of electrostatic separation can be further optimized.

While this invention has been presented and illustrated by the foregoing material, it will be understood that the scope of the invention is limited only by the appended claims.

We claim:

1. An improved process for manufacturing pure phosphate pebbles from run-of-mine phosphate rock comprising:
   a. crushing run-of-mine phosphate rock;
   b. drying crushed rock of Step (a);
   c. separating impure phosphate pebbles from the dried, crushed rock of Step (b); and
   d. purifying impure phosphate pebbles of Step (c).

2. The process according to claim 1 including the step of further selectively crushing at least a portion of the dried, crushed rock of Step (b) prior to separating impure phosphate pebbles therefrom in Step (c).

3. The method according to claim 2 in which run-of-mine phosphate rock is crushed in Step (a) to a size less than about one inch, and material having an average size more than about ½ inch is then separated therefrom and further crushed to a size less than about ½ inch.

4. A method according to claim 1 in which the impure phosphate pebbles of Step (c) have a size range between about ½ inch and about 20 mesh.

5. The method according to claim 1 in which the impure phosphate pebbles are purified by attrition in a fluid-bed type of scrubber to remove adhered clay therefrom.

6. The method of claim 1 including the additional step of further purifying phosphate pebbles of Step (d) through electrostatic separation.

7. The method according to claim 1 in which the purified phosphate pebbles are further purified by a process comprising
   (a). selectively disintegrating said purified phosphate pebbles to a size range between about −20 and about +200 mesh, and
   b. separating phosphate of reduced iron and aluminum content from said disintegrated pebbles by electrostatic separation.

8. A process according to claim 7 in which −200 mesh size fines are formed in Step (a) and are separated from the desired −20 +200 mesh size material prior to Step (b).

9. The method according to claim 8 wherein the amount of −200 mesh fines produced is maintained at less than about 10 weight percent of the material treated in Step (a).

10. The method according to claim 9 in which the product of separation in Step (b) is phosphate pebbles containing less than about 2.5 weight percent iron and aluminum.

11. The method according to claim 9 in which the product of the process represents at least about 30 weight percent of the original run-of-mine rock and contains at least about 50 weight percent of the $P_2O_5$ originally present in the run-of-mine rock.

* * * * *